United States Patent
Gupta et al.

(10) Patent No.: US 10,243,841 B2
(45) Date of Patent: Mar. 26, 2019

(54) MULTICAST FAST REROUTE AT ACCESS DEVICES WITH CONTROLLER IMPLEMENTED MULTICAST CONTROL PLANE

(71) Applicant: CISCO TECHNOLOGY, INC., San Jose, CA (US)

(72) Inventors: Shishir Gupta, Santa Clara, CA (US); Dharmarajan Subramanian, Bangalore (IN); Javed Asghar, Dublin, CA (US)

(73) Assignee: Cisco Technology, Inc., San Jose, CA (US)

( * ) Notice: Subject to any disclaimer, the term of this patent is extended or adjusted under 35 U.S.C. 154(b) by 74 days.

(21) Appl. No.: 15/173,951

(22) Filed: Jun. 6, 2016

(65) Prior Publication Data

US 2017/0353382 A1    Dec. 7, 2017

(51) Int. Cl.
| | |
|---|---|
| H04L 12/26 | (2006.01) |
| H04L 12/703 | (2013.01) |
| H04L 12/761 | (2013.01) |
| H04L 12/18 | (2006.01) |
| H04L 12/707 | (2013.01) |
| H04L 12/801 | (2013.01) |

(52) U.S. Cl.
CPC ............... *H04L 45/28* (2013.01); *H04L 12/18* (2013.01); *H04L 12/1863* (2013.01); *H04L 12/1886* (2013.01); *H04L 45/16* (2013.01); *H04L 45/22* (2013.01); *H04L 47/10* (2013.01)

(58) Field of Classification Search
None
See application file for complete search history.

(56) References Cited

U.S. PATENT DOCUMENTS

| | | |
|---|---|---|
| 5,485,465 A | 1/1996 | Liu et al. |
| 5,671,215 A | 9/1997 | Folgar |
| 6,097,720 A | 8/2000 | Araujo et al. |
| 7,519,662 B2 | 4/2009 | Watkinson |
| | (Continued) | |

OTHER PUBLICATIONS

IETF"Multicast only FastRe-Route draft-ietf-rtgwg-mofrr-08" A Karen etal,May 18, 2015 https://www.juniper.net/documentation/en_US/junos14.1/topics/concept/mcast-fast-reroute.html.
(Continued)

*Primary Examiner* — Anh Vu H Ly
(74) *Attorney, Agent, or Firm* — Cindy Kaplan

(57) ABSTRACT

In one embodiment, a method includes computing at a controller, a primary path and a backup path for transmittal of multicast data from service nodes in communication with the controller and a multicast source to access nodes in communication with multicast receivers, and transmitting from the controller, information for the primary path and the backup path to the access nodes for use by the access nodes in receiving the multicast data on the primary path and the backup path, and switching transmittal of the multicast data to the multicast receivers from the primary path to the backup path upon identifying a failure in the primary path to provide fast reroute at the access nodes. A multicast control plane runs in the controller without operating in the access nodes. An apparatus is also disclosed herein.

19 Claims, 7 Drawing Sheets

(56) References Cited

U.S. PATENT DOCUMENTS

| | | | |
|---|---|---|---|
| 8,958,286 B1* | 2/2015 | Atlas | H04L 12/18 370/225 |
| 9,674,075 B1* | 6/2017 | Nagarajan | H04L 45/22 370/389 |
| 2003/0112749 A1 | 6/2003 | Hassink et al. | |
| 2006/0050643 A1 | 3/2006 | Yoshimoto et al. | |
| 2006/0120396 A1 | 6/2006 | Hasegawa et al. | |
| 2006/0221975 A1 | 10/2006 | Lo et al. | |
| 2008/0031130 A1* | 2/2008 | Raj | H04L 45/00 370/225 |
| 2008/0062948 A1* | 3/2008 | Ponnuswamy | H04W 28/18 370/342 |
| 2008/0219268 A1* | 9/2008 | Dennison | H04L 12/4625 370/395.2 |
| 2009/0201803 A1* | 8/2009 | Filsfils | H04L 12/185 370/222 |
| 2009/0245248 A1* | 10/2009 | Arberg | H04L 12/185 370/390 |
| 2012/0263226 A1* | 10/2012 | Inohiza | H04N 19/37 375/240.02 |
| 2013/0107699 A1* | 5/2013 | Miclea | H04L 45/68 370/228 |
| 2013/0301403 A1* | 11/2013 | Esale | H04L 45/16 370/221 |
| 2015/0085644 A1* | 3/2015 | Kotalwar | H04L 45/28 370/228 |
| 2015/0172070 A1* | 6/2015 | Csaszar | H04L 12/1863 370/218 |
| 2016/0006609 A1* | 1/2016 | Zhao | H04L 45/50 370/254 |
| 2016/0142284 A1* | 5/2016 | Ma | H04L 12/18 370/225 |
| 2017/0054634 A1* | 2/2017 | Zhou | H04L 45/50 370/389 |
| 2017/0093612 A1* | 3/2017 | Singh | H04L 12/18 370/389 |

OTHER PUBLICATIONS

Holbrook et al,"Multicast Channels:Express Support for Large-scale Single-source Applications",ACM 1-58113-135-6/99/0006, 1999.

"IPriori 6.2: Carrier-Class Software System", Avici Systems Inc.,2004.

\* cited by examiner

MULTICAST FAST REROUTE AT ACCESS DEVICES WITH CONTROLLER IMPLEMENTED MULTICAST CONTROL PLANE

TECHNICAL FIELD

The present disclosure relates generally to communication networks, and more particularly, to fast convergence for multicast.

BACKGROUND

Conventional multicast routing systems depend on unicast routing protocols to detect a network failure. Redirection of impacted traffic does not occur until after the network failure has been identified by the unicast routing protocol and a new path has been established. In many cases, such as video applications that require near-zero packet loss, this impacts end user experience during failure recovery. Multicast only Fast Reroute (MoFRR) was developed to provide fast reroute and prevent packet loss. MoFRR is used to reroute data before a failure is identified by a unicast routing protocol to provide minimal packet loss. Fast reroute to a backup path may be provided by making a local decision to switch to the backup, which requires less time than waiting for a unicast routing protocol signal on the network to switch to backup. However, MoFRR does not work in topologies in which forwarding nodes do not participate in multicast signaling.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
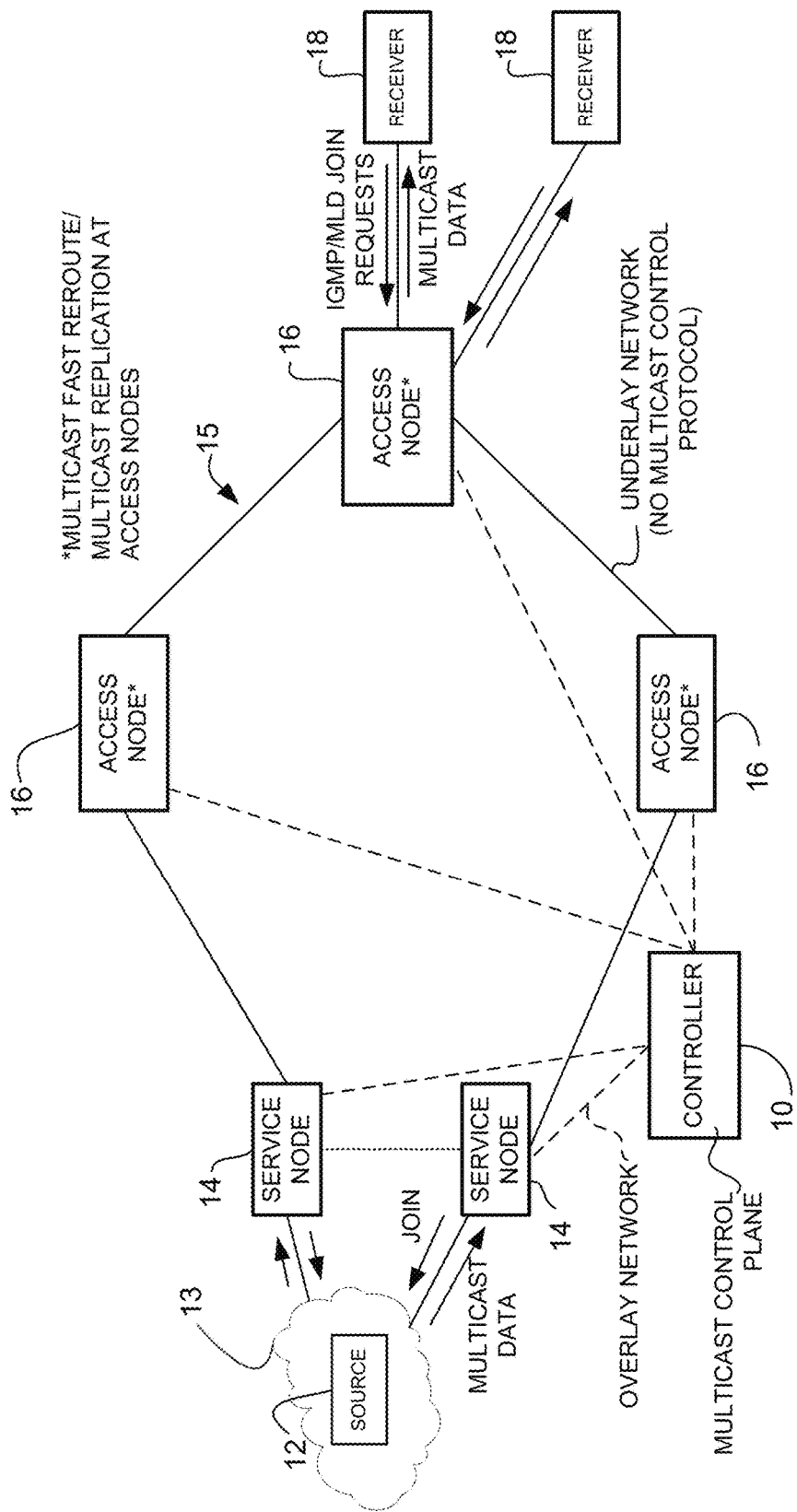
FIG. 1 illustrates an example of a network in which embodiments described herein may be implemented.

In one embodiment, a method generally comprises computing at a controller, a primary path and a backup path for transmittal of multicast data from service nodes in communication with the controller and a multicast source to access nodes in communication with multicast receivers, and transmitting from the controller, information for the primary path and the backup path to the access nodes for use by the access nodes in receiving the multicast data on the primary path and the backup path, and switching transmittal of the multicast data to the multicast receivers from the primary path to the backup path upon identifying a failure in the primary path to provide fast reroute at the access nodes. A multicast control plane runs in the controller without operating in the access nodes.

In another embodiment, a method generally comprises receiving at an access device from a controller running a multicast control plane, information identifying a primary path and a backup path from service nodes to the access device for receiving multicast data, forwarding a join request received at the access device from a multicast receiver to one of the service nodes without processing the join request, receiving the multicast data on the primary path and the backup path, forwarding the multicast data from the primary path to the multicast receiver, and upon identifying a failure in the primary path and performing a fast reroute at the access device, forwarding the multicast data from the backup path to the multicast receiver.

In yet another embodiment, an apparatus generally comprises interfaces for receiving multicast information and transmitting path information to access nodes in communication with multicast receivers, a processor for processing the multicast information, computing for each of a plurality of multicast groups, a primary path and a backup path for transmittal of multicast data to the access nodes, and transmitting the path information identifying the primary path and the backup path to the access nodes for use by the access nodes in receiving multicast data on the primary path and backup path and switching transmittal of the multicast data to the multicast receivers from the primary path to the backup path at the access nodes upon a failure in the primary path to provide fast reroute at the access nodes, and memory for storing a forwarding information base comprising the path information. A multicast control plane is configured to run in the apparatus without operating at an access network comprising the access nodes.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Networks such as those for use in transporting digitized television programs or Service Provider (SP) multicast networks that carry IPTV traffic, for example, often require a high degree of multicast resilience. This is due in part to the sensitivity of applications to packet loss and low latency requirements. A network that guarantees zero (or near-zero) packet loss in the case of a single network failure is referred to as an active/active (or live-live) network. This may be accomplished using MoFRR (Multicast only Fast Reroute). In order to achieve high multicast resilience, duplicate streams of data are sent over diverse (disjoint) paths. Conventional MoFRR solutions attempt to minimize packet loss by modifying protocol behavior for multicast joins. Instead of joining a single PIM (Protocol Independent Multicast) neighbor, nodes implementing MoFRR join a primary and backup path to build both multicast trees and use RPF (Reverse Path Forwarding) on the converging node to select one flow. On link failure of primary path, the backup path switch over is a node local decision, which helps in very fast convergence and minimal traffic loss.

In carrier Ethernet deployments built over virtual chassis fabric systems, such as an SDN (Software Defined Networking) controlled access device cluster or satellite access architecture in a remote port extender model, there is no inherent MoFRR solution for multicast traffic. Given the typical deployment scale and nature of cheap commoditized access devices expected to be used in such cases, these devices are essentially Layer 2 (L2) forwarding nodes with local multicast replication offloaded to L2 snooping tables for efficiency. In such cases, IP multicast MoFRR solutions cannot work unless the access nodes themselves participate in signaling joins and implement primary and secondary data path tables, thus increasing their cost and complexity and the operating expense of managing these devices.

The embodiments described herein provide multicast fast reroute in an underlay network based on primary and backup paths computed by a controller running a multicast control plane in an overlay network. The embodiments may be implemented, for example, in a virtual chassis fabric system with data plane offload of multicast data replication to access devices while the multicast control plane and protocols run on a controller. In one embodiment, the control plane runs only in the controller. In another embodiment, the control plane also runs in service nodes, which synchronize with the controller for scale and fast convergence.

As described in detail below, the access devices do not need to participate in a multicast join process. Instead, multicast joins may be transparently forwarded by an access node to a designated service node in communication with the controller. Service nodes may independently send out joins towards a multicast core, thereby forming primary (active) and backup (standby) paths via primary and backup service nodes, respectively. For various failures, a multicast tree built for the backup service node helps to achieve fast reroute convergence for multicast traffic in the network with fast reroute switchover taking place on the access node. Fast reroute is achieved with multicast protocol (control plane) separated from multicast data replication (data plane), thereby allowing independent scaling and capabilities for control and data planes without the need for access nodes to implement multicast control protocols for redundant paths. In contrast to conventional MoFRR solutions that necessitate a signaling protocol specific implementation for IPv4, IPv6, and MPLS multicast, the embodiments described herein provide a common multicast fast reroute solution for IPv4/IPv6 (PIM) and LSM (Label Switched Multicast) (MLDP (Multicast Label Distribution Protocol)). The access devices do not need to be aware of these protocols or have hardware or software functionality to build primary and backup paths for each protocol.

A join request forwarded to a designated service node 14 may be synchronized to all other service nodes to create a backup path. For example, the join request may be synchronized between the service nodes 14 directly using a protocol such as ICCP or via the controller 10, which upon learning about the join request can also push the join request selectively to various service nodes for use creating a backup path.

Referring now to the drawings, and first to FIG. 1, a network in which embodiments described herein may be implemented is shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The nodes may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, the network includes a controller 10 in communication with two service nodes 14 and an access network 15 comprising a plurality of access nodes 16. The service nodes 14 are in communication with a source (multicast source) 12 located at core network 13. For simplification of illustration, receivers (multicast receivers) 18 are shown only in communication with one of the access nodes 16. Each access node 16 may be in communication with any number of receivers 18. Also, the access network 15 may include any number of access devices 16.

In one example, the network operates in a carrier Ethernet deployment built over a virtual chassis fabric system (e.g., SDN (Software Defined Networking) controlled access device cluster or satellite access architecture in a remote port extender model). The controller 10 manages an underlay (fabric service) over the access nodes 16 to provide overlay services from the service nodes 14. The access nodes 16 receive their forwarding unit programming directly from the controller 10. In the example shown in FIG. 1, the fabric system is terminated by the two service nodes 14 to form a virtual ring fabric system that shares the controller 10. It is to be understood that the virtualized fabric shown in FIG. 1 and described herein is only an example and that the embodiments described herein may be implemented in other types of networks having various network topologies. For example, the network may comprise a ring topology as shown in FIG. 1 or any other network topology (e.g., mesh, star, hub and spoke, etc.).

The network is configured to use IP (Internet Protocol) multicast, which simultaneously delivers a single stream of information to numerous recipients. For example, the receivers 18 shown in FIG. 1 may join a multicast group comprising source 12. The multicast group is an arbitrary group of receivers that expresses an interest in receiving a particular data stream. An IP multicast address, or a portion thereof, specifies a particular group. Hosts (receivers) 18 that are interested in receiving data flowing to a particular group join the group by transmitting a join message, using Internet Group Management Protocol (IGMP) or Multicast Listener Discovery (MLD), for example. Multicast-capable routers (e.g., service nodes 14) create distribution trees that control the path that IP multicast traffic takes through the network in order to deliver traffic to all of the receivers 18. Members of multicast groups can join or leave at any time; therefore the distribution trees are dynamically updated. In one embodiment, Protocol Independent Multicast (PIM) is used to dynamically create a multicast distribution tree to ensure distribution to intended receivers, while limiting distribution so that network segments that are not in the path between the source and receivers are not burdened with unnecessary traffic. It is to be understood that PIM is only one example and that other multicast protocols may be used without departing from the scope of the embodiments.

Source 12 may be a node (e.g., server, computer) or any other type of network device or group of network devices that can source IP media, such as video, audio, voice, data, etc. The source 12 transmits a multicast data stream to service nodes 14, which transmit the multicast data to one or more receivers 18 via the access network (access nodes 16). The receiver 18 may be a node that receives and stores or renders a multicast stream, a network in communication with a receiver node, or a gateway to another network. The receiver 18 may be, for example, a computer terminal, personal computer, laptop, mobile device, tablet, television with IP interface, Set Top Box (STP), Digital Video Recorder (DVR), Voice over IP (VoIP) phone, cell phone, etc. One or more access devices 16 are located in the data path between the source 12 and receiver 18.

The access node 16 may comprise a network device (e.g., L2, L3, or L2/L3 device) capable of forwarding multicast data to receivers 18. The access node 16 may comprise, for example, a switch (also referred to as a satellite or satellite switch). As previously noted, the access devices 16 do not participate in the multicast join process. Instead, join requests received from the receivers 18 are transparently forwarded by the access nodes 16 to the designated service nodes 14. The access nodes 16 do not need to be aware of the control protocols or comprise hardware or software functionality to build primary and backup paths for each traffic type. Thus, the access nodes 16 may comprise any OEM (Original Equipment Manufacturer)/ODM (Original Design Manufacturer) access device and there is no need for MoFRR compliance hardware or protocol modification support needed. The access devices 16 may be configured for standard P2P (Point-to-Point) and P2MP (Point-to-Multipoint) L2 services for multicast offload.

In terms of forwarding paradigm, the access devices 16 may be programmed to just have primary and backup underlay fabric connects. As described below, the controller 10 may program both the service nodes 14 and the access devices 16 to enable offload services over this underlay such that while most traffic is simply switched through the access device, offloaded services such as multicast replication can go through a replication pass in the switch's forwarding unit for replication towards access ports. In one example, the access node 16 comprises an L2 forwarding node with local multicast replication offloaded to L2 snooping tables. Data plane replications may be pushed to the less capable access nodes 16 by a simplified signaling process. In one example, the offload of multicast data replication may take place within the scope of a bridge domain for IPTV use cases.

As previously described and shown in FIG. 1, the virtualized fabric system (access network, underlay network) comprising the access nodes 16 may be terminated by the service nodes 14. The service nodes 14 may be loosely coupled and share the common controller 10 with the access network 15. The term "service node" as used herein refers to a network device operable to forward multicast data from a multicast source. The service node 14 may comprise, for example, a router or other forwarding device (e.g., L3, L2/L3 device). In one embodiment, the service nodes 14 are operable to run multicast protocols and process join requests received from the access nodes 16. The service nodes 14 may be configured to replicate a copy of data for the same multicast group across different bridge domains or ring topologies. The service nodes 14 may synchronize multicast (join) states and tables between themselves and the controller 10. The service nodes 14 may use, for example ICCP (Inter-Chassis Communication Protocol) described in IETF (Internet Engineering Task Force) RFC (Request for Comments) 7275 or any other suitable protocol to communicate with one another. One or more of the service nodes 14 may be configured with a Bridge Virtual Interface (BVI).

The service nodes 14 are configured to operate as multicast Designated Forwarders (DFs) and Backup Designated Forwarders (BDFs). As described in detail below, the access nodes 16 select one of the service nodes as a DF and the other as a BDF based on path information received from the controller 10 identifying a primary path and a backup path. In one example, each access node 16 identifies one service node 14 as the DF and the other service node as the BDF for each multicast stream (S,G). The access nodes 16 may select DF and BDF per flow to allow load splitting between the service nodes 14, as described below.

In the example shown in FIG. 1, the virtualized fabric system is terminated by two service nodes 14; one at each end of the virtual ring fabric system. As previously noted, the topology is not restricted to a simple ring topology and there may be 1:N redundant paths with any number of service nodes 14 in communication with the controller 10. Also, multiple redundant service nodes 14 may be provided for geographic redundancy so that multiple paths are ready for fast reroute. If needed, some of these paths may be active/active to load split flows.

The controller 10 may comprise, for example, an ODL (OpenDaylight) controller (e.g., Service Provider (SP) Software Defined Networking (SDN) controller) or an APIC (Application Policy Infrastructure Controller) in a data center. As described in detail below, the controller 10 is operable to compute routing and forwarding tables consisting of active and redundant multicast trees for the access nodes 16 and program the access nodes through the underlay network that is managed by the controller. The controller 10 may operate, for example, on one or more of the service nodes 14 or as an isolated network function or as a separate entity (as shown in FIG. 1). Thus the term "controller" as used herein may refer to a controller function operating at one or more network devices. The control plane may run on the service nodes 14 or on the controller 10 directly depending on the latency needs, flexibility, and scale of the system.

As previously noted, the controller 10 and service nodes 14 may both run the multicast control protocols. In another embodiment, only the controller 10 runs the multicast control protocols and not the service nodes 14. In this embodiment, the service nodes 14 just participate in tunneling join requests from the access devices 16 to the controller 10 and then programming states for data plane processing. In this case, there is no multicast control plane running in the fabric or the underlay network (including the service nodes and access nodes). The controller 10 processes join requests from the access nodes 16, which are tunneled to it through the service nodes 14. The controller 10 then builds a virtual MRIB (Multicast Routing Information Base) (vMRIB) and virtual MFIB (Multicast Forwarding Information Base (vMFIB), programs the relevant vMFIB entries into the access devices 16, and coordinates the core side join as well as data packet tags (described below) for offload signaling on the service nodes 14.

In one embodiment, tagged data frames may be used to differentiate data on primary and backup paths. Fast reroute may be achieved by allowing specific tagged data frames from primary to backup and vice versa, so that there is traffic circling between the service nodes 14 in both directions, if the topology is a simple ring topology. The setup of these special tags and interconnect between the primary and backup fabric ports for those service instances may also be managed by the controller 10 so that data frames tagged for offload go through the interconnect and back onto the network while the non-offloaded frames go to the switch's forwarding units, to be transmitted out of the correct access port, without being flooded into the service between the fabric ports.

As described in detail below, the access nodes 16 are operable to perform fast reroute upon identification of a failure in their primary path. The fast reroute described herein may be used for all failures with convergence for service node core side failure, ring failure, or any service node, access node, or link failure to allow devices to switch to the backup service node based multicast tree by simply changing their local DF (Designated Forwarder) affinity. In one example, deterministic sub-second (and <50 milliseconds depending on access device hardware) convergence (or other fast convergence times) may be provided by the embodiments described herein.

The term "fast reroute" as used herein refers to an MoFRR type fast reroute in which a primary path and backup path are both available at a network node (active/active, live-live) to provide a fast switchover to the backup path following a failure in the primary path. The embodiments provide for a backup path that is available at the access node 16 without the need for multicast control protocols running on the access node.

It is to be understood that the network shown in FIG. 1 and described above is only an example and the embodiments described herein may be implemented in networks comprising different network topologies or network devices, or using different network protocols without departing from the scope of the embodiments. For example, the network may include any number or type of network devices that facilitate passage of data over the network (e.g., routers, switches, gateways), network elements that operate as endpoints or hosts (e.g., servers, virtual machines, clients), and any number of network sites in communication with any number of core networks. Also, the topology is not limited to a ring topology and the embodiments described herein may be used in other topologies to achieve fast reroute when there are redundant fabric paths in a controlled access network. For example, there may be 1:N redundant paths with fast reroute triggered between specific sets of primary and backup paths. The embodiments may be implemented based on any network topology, including a leaf-spine architecture, mesh, ring, star, hub and spoke, or any other topology.

Moreover, the topology illustrated in FIG. 1 and described above is readily scalable and may accommodate a large number of components, as well as more complicated arrangements and configurations. For example, the network may include any number of fabrics. Thus, network nodes may be used in any suitable network topology, which may include any number of servers, virtual machines, switches, routers, appliances, controllers, gateways, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 2:
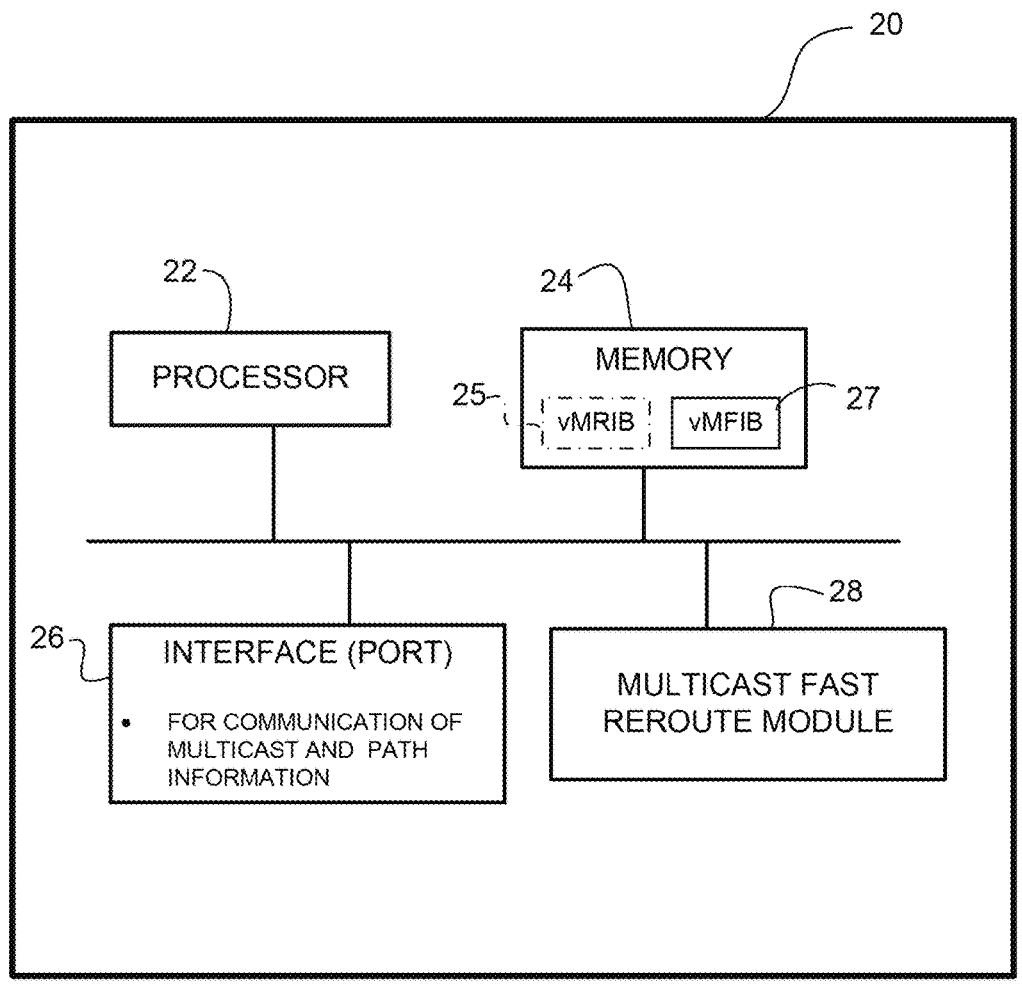
FIG. 2 depicts an example of a network device useful in implementing embodiments described herein.

FIG. 2 illustrates an example of a network device 20 (e.g., controller 10, service node 14, access node 16) that may be used to implement the embodiments described herein. In one embodiment, the network device 20 is a programmable machine that may be implemented in hardware, software, or any combination thereof. The network device 20 includes one or more processor 22, memory 24, network interface 26, and multicast fast reroute module 28 (e.g., multicast logic, software, firmware at controller 10, fast reroute logic, software, firmware at the access node 16).

Memory 24 may be a volatile memory or non-volatile storage, which stores various applications, operating systems, modules, and data for execution and use by the processor 22. For example, multicast or fast reroute components (e.g., module, code, logic, software, firmware, etc.) may be stored in memory 24. The device may include any number of memory components. Memory 24 may also store forwarding or routing tables. For example, memory 24 at the controller 10 may comprise vMRIB 25 and vMFIB 27. Memory 24 at the access device 16 may include the vMFIB 27.

Logic may be encoded in one or more tangible media for execution by the processor 22. For example, the processor 22 may execute codes stored in a computer-readable medium such as memory 24 to perform the processes described below with respect to FIGS. 3, 4, 5, 6, and 7. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. The network device 20 may include any number of processors 22. In one example, the computer-readable medium comprises a non-transitory computer-readable medium.

The network interface 26 may comprise any number of interfaces (linecards, ports) for receiving data or transmitting data to other devices. The network interface 26 may include, for example, an Ethernet interface for connection to a computer or network. The port 26 may comprise, for example, access ports at the access node 16. As shown in FIG. 1 and described above, the interface 26 at the access device 16 may be configured to receive and transparently forward join requests, receive and transmit multicast data, and receive vMFIB entries. The interface 26 at the controller 10 may be configured, for example, to receive join requests and transmit vMFIB entries. The interface 26 at the service node 14 may be configured to forward join requests to the source 12. The network interface 26 may be configured to transmit or receive data using a variety of different communication protocols. The interface may include mechanical, electrical, and signaling circuitry for communicating data over physical links coupled to the network.

It is to be understood that the network device 20 shown in FIG. 2 and described above is only an example and that different configurations of network devices may be used. For example, the network device 20 may further include any suitable combination of hardware, software, processors, devices, components, modules, or elements operable to facilitate the capabilities described herein.

Figure 3:
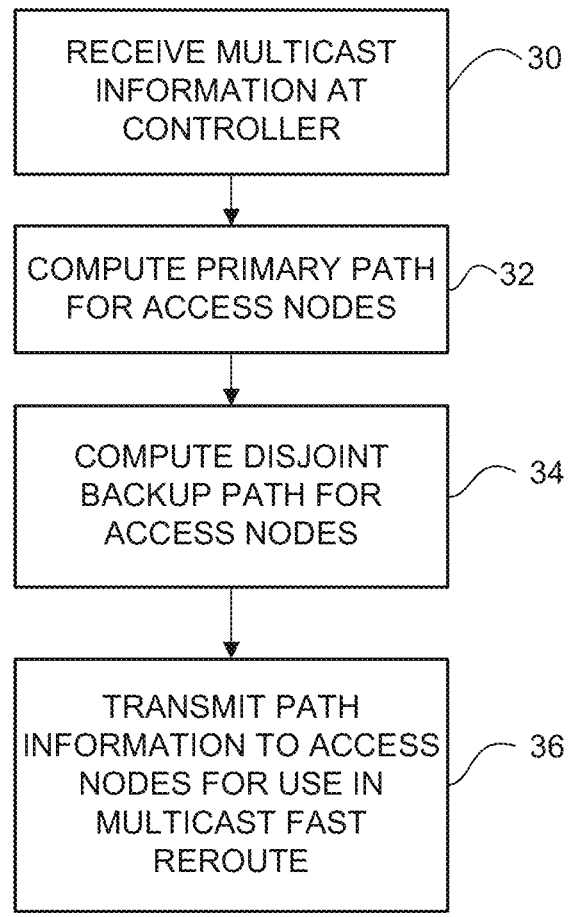
FIG. 3 is a flowchart illustrating an overview of a process for multicast control plane set up to provide fast reroute at access nodes, in accordance with one embodiment.

FIG. 3 is a flowchart illustrating an overview of a process for multicast control plane set up at the controller 10 for use in fast reroute at access nodes 16, in accordance with one embodiment. At step 30, the controller 10 receives multicast information (FIGS. 1 and 3). The multicast information may comprise, for example, join requests forwarded from the service nodes 14 or information about the join requests received at the service nodes (e.g., join states and tables synced from the service node to the controller), if the service nodes participate in the multicast control plane. The service node 14 may sync the multicast information between other service nodes, either directly or via the controller 10 to form the multicast primary and backup trees. The service nodes 14 propagate the joins towards the source 12 to form the multicast primary and backup trees. The controller 10 may also receive topology and telemetry data (e.g., hop count, latency, device health score, video quality, etc.). The multicast information is used by the controller to determine paths that need to be established to deliver multicast data from the service nodes 14 to the access nodes 16. The controller 10 computes one or more primary paths for the access nodes 16 (step 32). SLA (Service-Level Agreement) telemetry data may be used to compute and build the optimal primary path (active path, primary constrained path). The controller 10 then computes one or more backup paths for the access nodes 16 (step 34). A path selection algorithm may be used to compute and build optimal disjoint constrained backup paths by excluding the topology path of the primary path. For each multicast group (S,G) the controller 10 may compute a virtual MRIB (Multicast Routing Information Base) (vMRIB) comprising 1:N active and redundant multicast trees for the access nodes 16 through the fabric or underlay network managed by the controller. Virtual MFIB (Multicast Forwarding Information Base (vMFIB) entries may then be pushed into access nodes 16 for replication (step 36). The offloaded vMFIB entry marks at least one primary path and one backup path that are disjoint (i.e., have no common links or nodes). As described below with respect to FIG. 4, multicast data from the primary path is forwarded to the receivers 18. If a failure occurs, multicast fast reroute is performed at the access node 16 to switch to the backup path.

Figure 4:
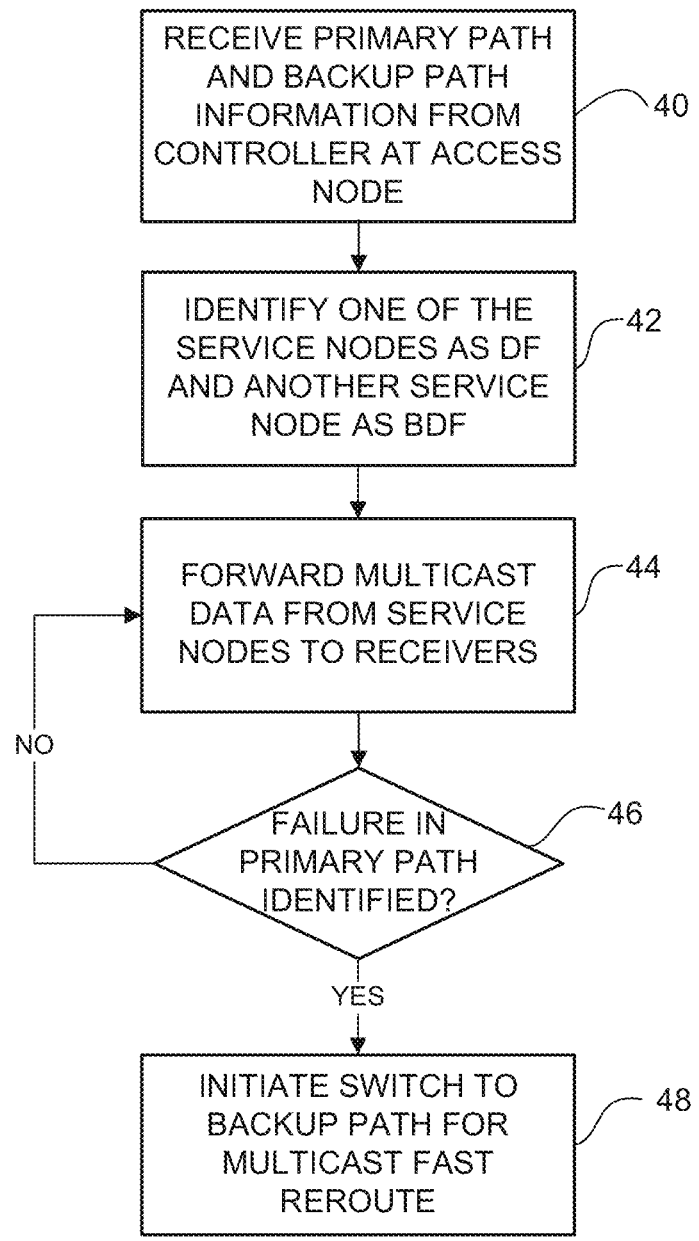
FIG. 4 is a flowchart illustrating an overview of a process for multicast fast reroute at the access nodes with a controller implemented multicast control plane, in accordance with one embodiment.

FIG. 4 is a flowchart illustrating an overview of a process for multicast fast reroute at the access node 16 with a controller implemented multicast control plane, in accordance with one embodiment. At step 40, the access node 16 receives primary path and backup path information transmitted from the controller 10. Each access device identifies one of the service nodes 14 as the Designated Multicast Forwarder (DF) and the other service node as the Backup Designated Multicast Forwarder (BDF), based on the path information received from the controller 10 (step 42). Join requests received on the participating access device 16 continue to be forwarded to the service node 14 that runs the unicast routing protocols for that device and multicast data is forwarded from the service nodes 14 to the receivers 18 (step 44). The service node 14 processes the join request (if the service node participates in the multicast control plane) or tunnels it to the controller (if the service node does not run multicast control protocols). Then, depending on the core side topology, each service node 14 sends a PIM join (L3 core—IPv4/IPv6), MLDP label mapping message (MPLS core), or flood IGMP join (L2 core) into the core. This sets up an active/active multicast fast reroute system for the access network with none of the access nodes 16 explicitly modified to program a primary or backup path. If the access node 16 identifies a failure in the primary (active) path (e.g., DF service node failure, service node core side failure, link or node in access network failure), the access node performs fast reroute to switch to the backup path and delivers the multicast data to the receivers 18 with minimal or no loss in network traffic (steps 46 and 48).

It is to be understood that the processes shown in FIGS. 3 and 4 and described above are only examples and that steps may be added, deleted, combined, or modified without departing from the scope of the embodiments.

Figure 5:
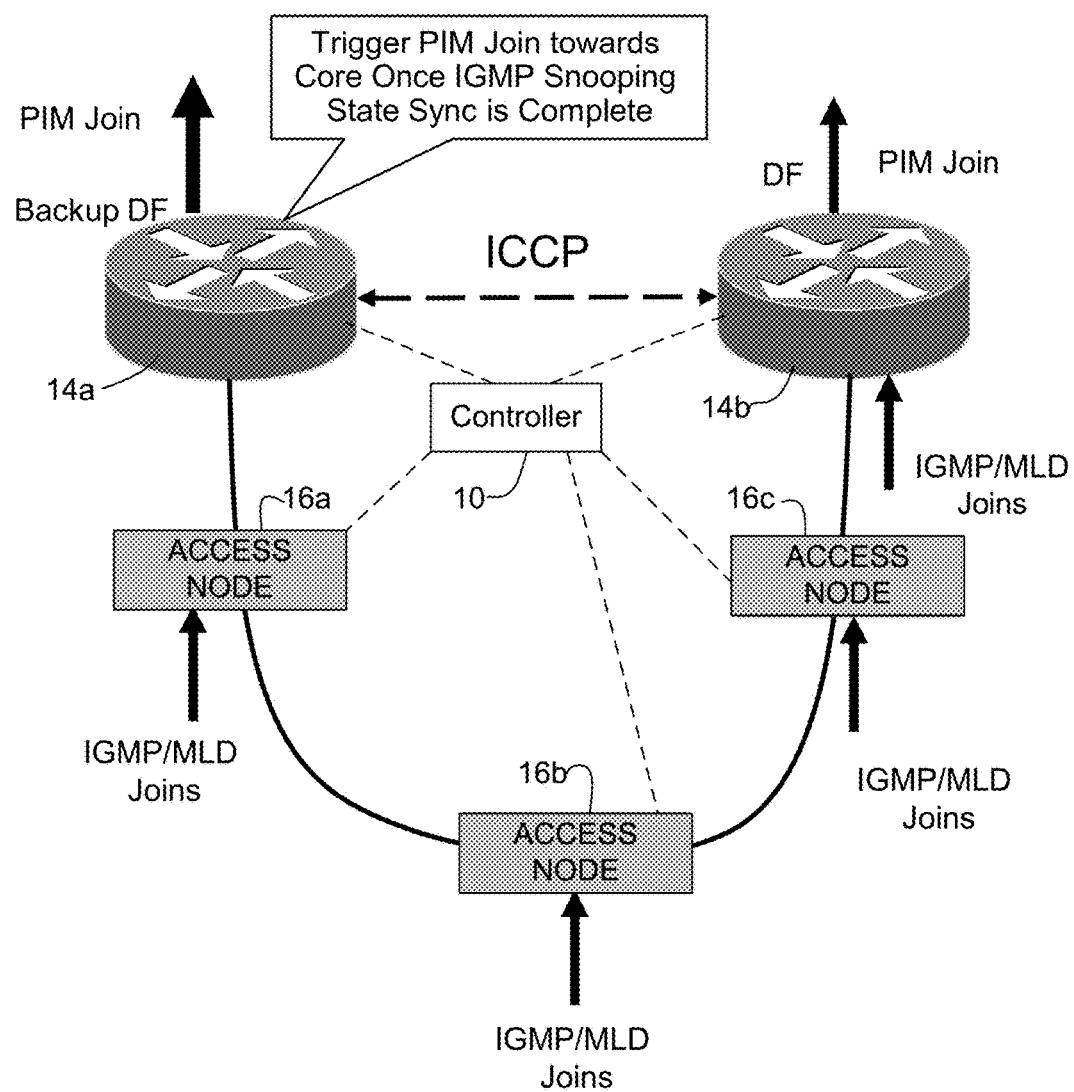
FIG. 5 illustrates a control plane setup for multicast fast reroute in the network of FIG. 1.

FIG. 5 illustrates control plane setup in the network of FIG. 1, in accordance with one embodiment. In this example, two service nodes 14a and 14b are in communication with three access devices 16a, 16b, 16c. IGMP/MLD join requests are received at the access nodes 16a, 16c, 16c from one or more receivers 18 (FIGS. 1 and 5). The service nodes 14a, 14b transmit PIM joins toward the core network 13 once IGMP snooping state synchronization is complete.

Figure 6:
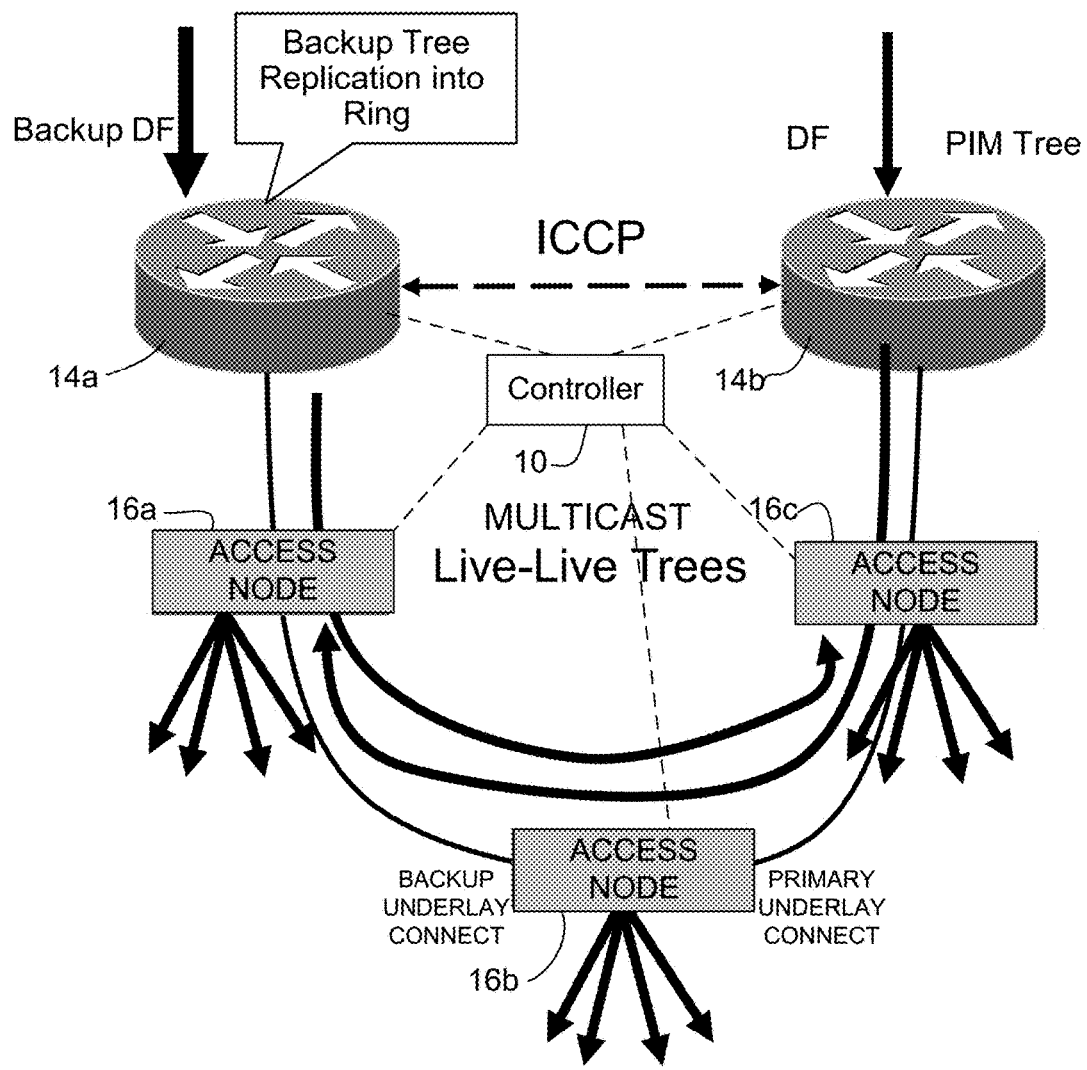
FIG. 6 illustrates a data plane setup for multicast fast reroute in the network of FIG. 1.

FIG. 6 illustrates data plane setup for the network shown in FIGS. 1 and 5, in accordance with one embodiment. In this example, each access node 16a, 16b, 16c receives multicast data from its DF service node and performs multicast replication to transmit multicast data to a plurality of receivers 18. The backup DF provides backup tree replication into the access network (ring in this example). Each access node 16a, 16b, 16c receives multicast data on a primary path and a backup path to create multicast live-live trees.

Figure 7:
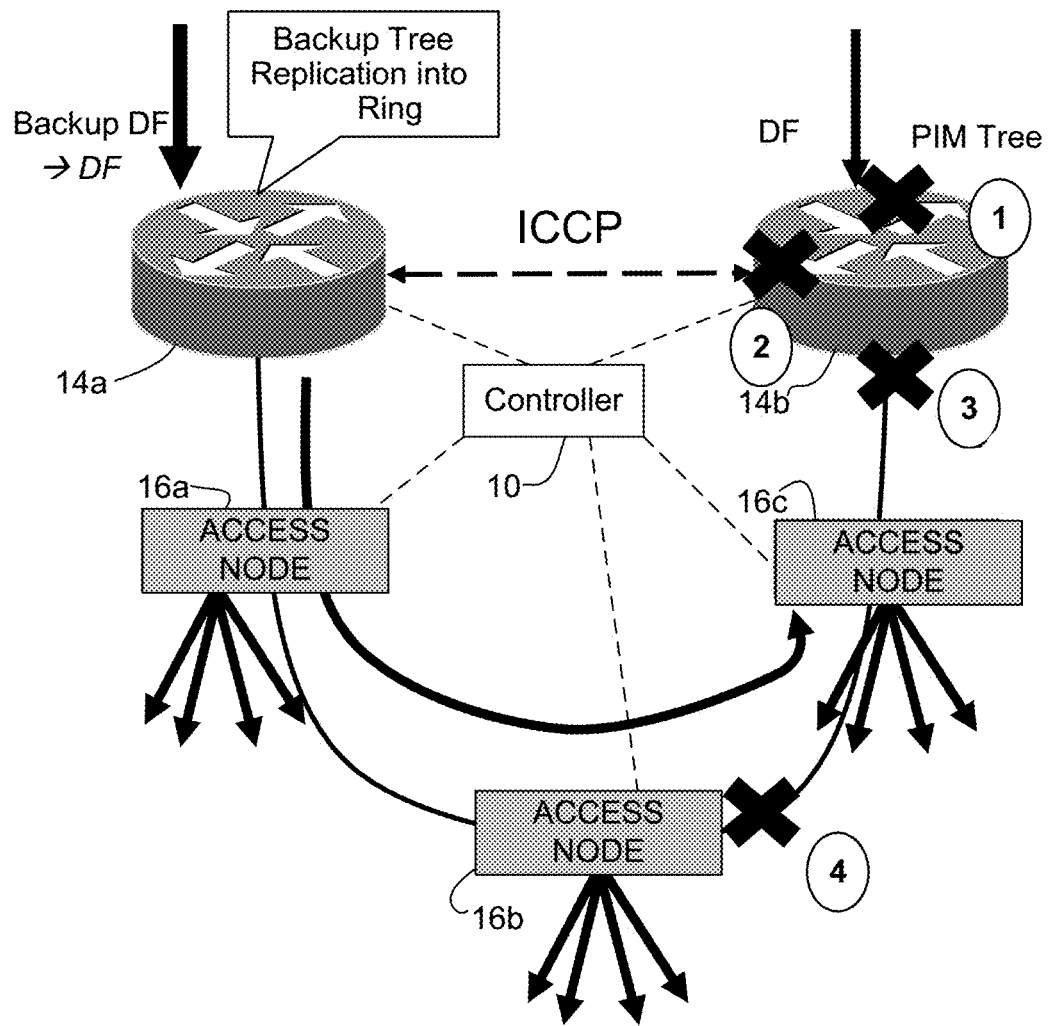
FIG. 7 illustrates multicast replication in the network of FIG. 6 following a failure and fast reroute.

FIG. 7 illustrates fast reroute at access node 16b after one or more failures in the primary path. One or more of the failures indicated at (1), (2), (3), or (4) may occur in the primary path. Failure (1) indicates a service node core side failure. Failure (2) indicates a failure at the service node 14b (DF). Failure (3) indicates a ring side failure at the DF. Failure (4) indicates failure of a link between access node 16c and access node 16b.

Referring again to FIG. 6, prior to failure, access node 16b receives multicast data at a primary underlay connect from DF service node 14b on a primary path extending from the service node through access node 16c. The access node 16b replicates multicast data received on this primary path and transmits it to receivers in communication with the access node. The access node 16b also receives the multicast data at a backup underlay connect from BDF service node 14a through access node 16a. Data received at access node 16b on this backup path is forwarded to access node 16c without being replicated or transmitted to the receivers. As previously described, the data frames may be tagged to indicate whether the data should be replicated and transmitted to the receivers or switched through the access device and forwarded on the access network.

Referring again to FIG. 7, upon receiving indication of a failure in the primary path, access node 16b performs fast reroute and switches to its backup path, which is now its primary path. The access node 16b switches to the backup multicast tree by changing its local DF affinity from service node 14b to service node 14a. Multicast data received from service node 14a is now transmitted to receivers at the access node 16b. If there is only a failure as indicated at (1), (2), or (3) (link between access nodes 16b and 16c still intact), service node 14a may also become the DF at node 16c. Since the multicast data is immediately available at the access node via the backup path, fast reroute at the access device may provide sub-second convergence for any failure in the primary path.

As can be observed from the foregoing, the embodiments described herein provide numerous advantages. For example, high availability and fast reroute/convergence of multicast traffic for network faults may be provided using an active/active system. One or more embodiments provide a common protocol free infrastructure that handles IPv4/IPv6 multicast without any changes to the access device hardware, software, or firmware, thus allowing feature extendibility to multicast protocol variants that the access device may not support natively. This allows for maximum use of less expensive access device capability and implementation of fast reroute without explicit hardware programming. Also, fast reroute may be achieved even while the multicast protocol (control plane) is separated from the multicast packet replication (data plane), allowing independent scaling and capabilities for control and data plane without the access nodes actually implementing redundant multicast paths. In one or more embodiments, a single point of monitoring is provided when the controller runs the multicast protocol and maintains all protocol states, thereby allowing efficient and summarized troubleshooting for a large scale network. One or more embodiments may be scaled to as many paths as there are redundant service nodes. The embodiments may also provide load splitting of flows.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
computing at a controller, a primary path and a backup path for transmittal of multicast data from service nodes in communication with the controller and a multicast source to access nodes in communication with multicast receivers;
transmitting from the controller, information for said primary path and said backup path to the access nodes for use by the access nodes in receiving said multicast data on said primary path and said backup path, and switching transmittal of said multicast data to the multicast receivers from said primary path to said backup path upon identifying a failure in said primary path to provide fast reroute at the access nodes; and
receiving at the controller a join request originating at one of the multicast receivers and transparently forwarded by one of the access nodes, so that the access node does need to participate in a multicast join process;
wherein a multicast control plane runs in the controller without operating in the access nodes and wherein fast reroute is performed in an underlay network based on said primary path and said backup path computed by the controller running said multicast control plane in an overlay network.

2. The method of claim 1 wherein said multicast data is received on said primary path via one of the service nodes identified as a designated forwarder and received on said backup path via another of the service nodes identified as a backup designated forwarder, wherein the multicast control plane does not run in the service nodes.

3. The method of claim 1 wherein the service nodes are configured to synchronize join states between the service nodes and the controller, and transmit a Protocol Independent Multicast (PIM) join, Multicast Label Distribution Protocol (MLDP), or Internet Group Management Protocol (IGMP) join to a core network comprising the multicast source.

4. The method of claim 1 wherein the multicast control plane runs on the service nodes and synchronizes with the controller for use by the controller in programming the access nodes.

5. The method of claim 1 wherein the access nodes are operable to perform multicast replication offloaded from the services nodes by the controller.

6. The method of claim 1 wherein computing said primary path and said backup path comprises computing a plurality of redundant paths, the controller computing said primary path and said backup path for each of a plurality of multicast flows to provide load splitting between the service nodes.

7. The method of claim 1 further comprising receiving telemetry data at the controller for use in selecting an optimal of said primary path, wherein said backup path is disjoint from said primary path.

8. The method of claim 1 wherein the access nodes comprise switches in an underlay network comprising the service nodes and wherein the controller comprises a Software Defined Networking (SDN) controller.

9. The method of claim 1 wherein said information for said primary path and said backup path comprises virtual Multicast Forwarding Information Base (vMFIB) entries computed at the controller for each of a plurality of multicast groups.

10. A method comprising:
receiving at an access device from a controller running a multicast control plane, information identifying a primary path and a backup path from service nodes to the access device for receiving multicast data;
transparently forwarding a join request received at the access device from a multicast receiver to the controller without processing said join request so that the access node does need to participate in a multicast join process;
receiving said multicast data on said primary path and said backup path;
forwarding said multicast data from said primary path to the multicast receiver; and
upon identifying a failure in said primary path and performing a fast reroute at the access device based on information computed at the controller, forwarding said multicast data from said backup path to the multicast receiver;
wherein fast reroute is performed in an underlay network based on said primary path and said backup path computed by the controller running said multicast control plane in an overlay network.

11. The method of claim 10 wherein said primary path and said backup path are stored in a virtual Multicast Forwarding Information Base (vMFIB), entries for said vMFIB computed by the controller for each of a plurality of multicast groups.

12. The method of claim 10 further comprising performing multicast replication offloaded from the service nodes for multiple receivers at the access device, wherein said multicast replication is offloaded utilizing point-to-multipoint layer 2 services.

13. The method of claim 10 wherein said primary path and said backup path are associated with a flow to provide load splitting between the service nodes.

14. The method of claim 10 wherein the access device is configured for operating in an underlay network comprising a plurality of access devices in communication with the service nodes comprising a designated forwarder for said primary path and a backup designated forwarder for said backup path.

15. The method of claim 10 wherein the controller comprises a Software Defined Networking (SDN) controller and wherein redundancy technologies for the SDN controller provide redundant instances of a compute element of the controller.

16. An apparatus comprising:
interfaces at a controller for receiving multicast information and transmitting path information to access nodes in communication with multicast receivers;
a processor at the controller for processing said multicast information, computing for each of a plurality of multicast groups, a primary path and a backup path for transmittal of multicast data to the access nodes, and transmitting said path information identifying said primary path and said backup path to the access nodes for use by the access nodes in receiving multicast data on said primary path and said backup path, and switching at the controller, transmittal of said multicast data to the multicast receivers from said primary path to said backup path at the access nodes upon a failure in said primary path to provide fast reroute at the access nodes; and memory for storing a forwarding information base comprising said path information;

wherein a multicast control plane is configured to run in the apparatus without operating in an access network comprising the access nodes and wherein fast reroute is performed in an underlay network based on said primary path and said backup path computed by the controller running said multicast control plane in an overlay network and wherein the controller receives a join request originating at one of the multicast receivers and transparently forwarded by one of the access nodes so that the access node does need to participate in a multicast join process.

17. The apparatus of claim 16 wherein the apparatus is configured to receive said multicast data on said primary path via a service node identified as a designated forwarder and receive said multicast data on said backup path via another service node identified as a backup designated forwarder, wherein the multicast control plane does not run in the service nodes.

18. The apparatus of claim 16 wherein video quality data for said multicast data is received at the processor for use in selecting said primary path and said backup path.

19. The apparatus of claim 16 wherein said primary path and said backup path are computed based on telemetry data input to a path selection algorithm.

* * * * *